Oct. 11, 1932.  A. G. F. WALLGREN  1,882,103
SHAFT BEARING
Filed April 23, 1930   2 Sheets-Sheet 1
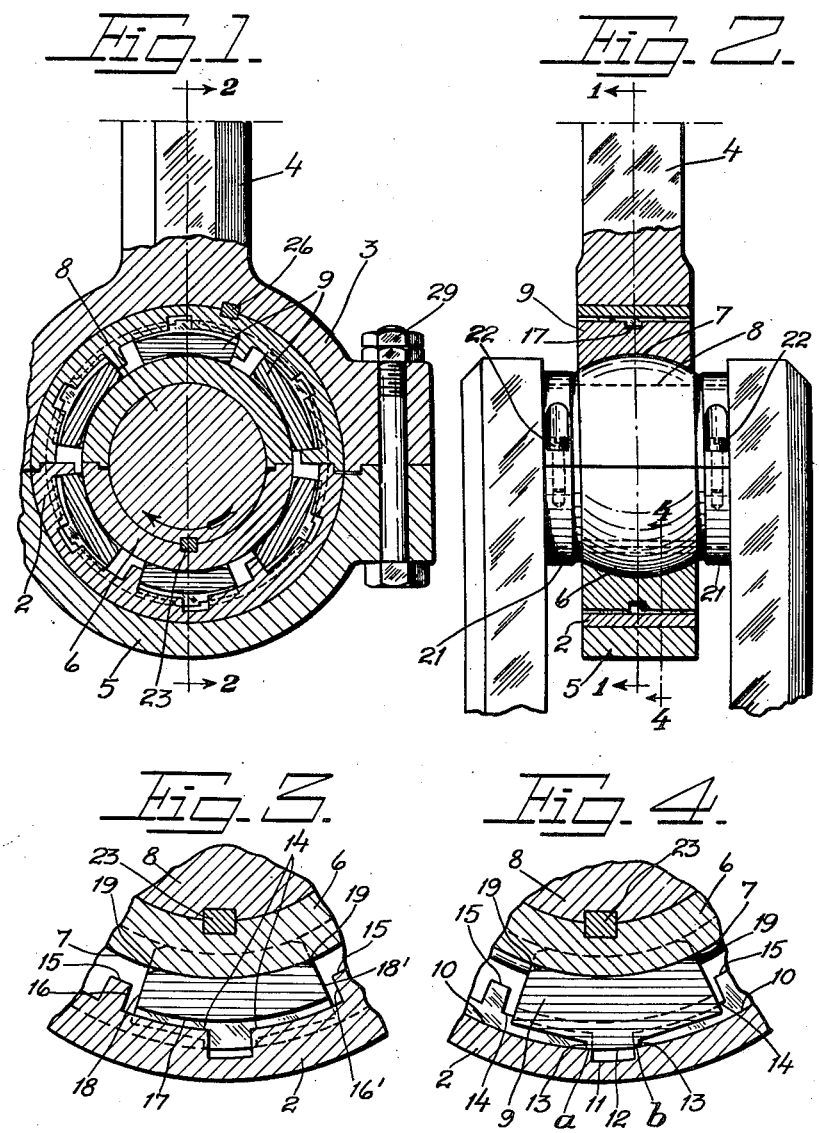

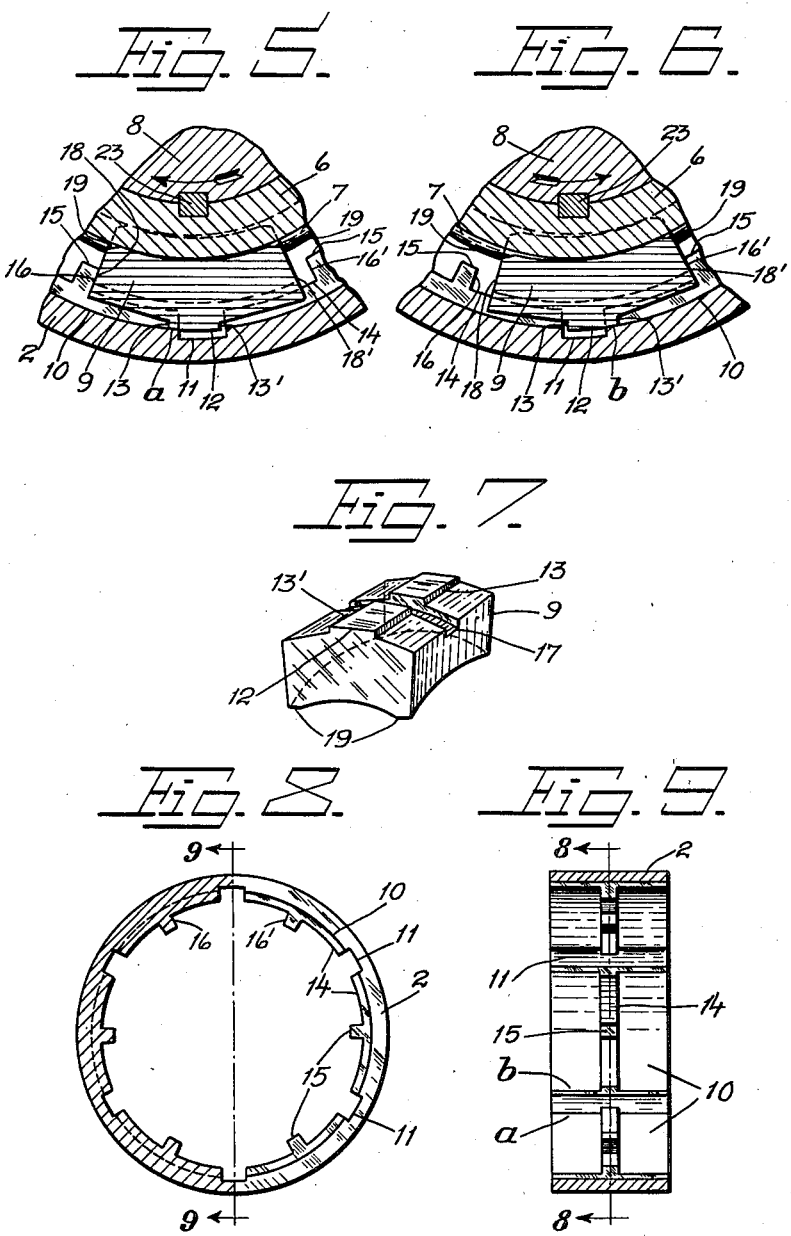

Patented Oct. 11, 1932

1,882,103

UNITED STATES PATENT OFFICE

AUGUST GUNNAR FERDINAND WALLGREN, OF STOCKHOLM, SWEDEN, ASSIGNOR TO AKTIEBOLAGET NOMY, OF STOCKHOLM, SWEDEN, A CORPORATION OF SWEDEN

SHAFT BEARING

Application filed April 23, 1930, Serial No. 446,468, and in Sweden April 27, 1929.

The present invention relates to sliding-block bearings of the general character disclosed in U. S. Patent No. 1,871,485, granted to me August 16, 1932, and has particular reference to bearings for connecting rods and the like wherein the outer bearing member as well as the inner bearing member moves during normal operation of the bearing.

In accordance with the present invention, the bearing blocks are tiltably supported by and have limited peripheral movement with respect to the outer bearing member, and slide with respect to the journal provided by the inner bearing member, which, in some instances, may be the journal of the shaft with which the bearing is associated.

The more detailed nature of the invention may best be understood from a consideration of the following description of a suitable form of construction for applying the invention to a connecting rod bearing, taken in conjunction with the accompanying drawings forming a part of this specification.

With reference to the drawings, Fig. 1 is a cross-sectional view taken on the line 1—1 of Fig. 2, showing a bearing for connecting rods embodying the present invention;

Fig. 2 is a cross-sectional view taken on the line 2—2 of Fig. 1;

Fig. 3 shows a bearing block and adjacent parts in sectional view taken on the line 1—1 of Fig. 2;

Figs. 4-6 are sectional views taken on the line 4—4 of Fig. 2;

Fig. 4 shows the bearing block in central position;

Fig. 5 shows the tilted position of the bearing block on shaft rotation in one direction, and Fig. 6 shows the tilted position of the block on shaft rotation in the other direction;

Fig. 7 is a perspective view of one of the bearing blocks;

Fig. 8 is in its right part a side view of a ring member forming part of the structure, while its left part is a sectional view taken on the line 8—8 of Fig. 9;

Fig. 9 is a cross-sectional view taken on the line 9—9 of Fig. 8.

Reference character 2 designates an annular ring member which is fixed within a connecting rod bearing housing. This ring member 2 is made in two parts and is held between the yoke member 3 at the lower part of the rod 4 and the cap member 5 which are secured together by means of bolts or the like 29. Reference character 8 designates the crank pin and secured to same is a bearing member 6 made in two parts. Member 6 is provided with flanges 21 into which are set screws 22 which hold the halves of the member together. Member 6 preferably has a spherical bearing surface 7. Between members 2 and 6 is a plurality of bearing blocks 9. Bearing blocks 9 have slight movement peripherally in relation to member 2. However, this movement is limited. Shaft pin 8 and member 6 constitute the rotary parts while the member 2 and the connecting rod bearing housing constitute a portion of the bearing which is movably mounted but not rotatable about its own axis. Blocks 9 are formed with spherical bearing surfaces which co-operate with the outer bearing surface 7 of member 6.

The annular ring member 2 (see Figs. 8 and 9) comprises a cylindrical portion and a projection portion extending inwardly from the middle of the cylindrical portion. The inside surfaces 10 of the cylindrical portion are cut by recesses 11 which extend axially and the portions of surface 10 immediately adjacent the recesses constitute tilting surfaces $a$ and $b$ (see Figs. 4, 5 and 6).

Projections 12 are wider than recesses 11. Adjacent to sides 13 and 13' of projections 12, the projections provide peripherally spaced surface portions adapted to cooperate respectively with surfaces $a$ or $b$ to tilt the blocks. When one of these surface portions of projection 12 adjacent a side 13 or 13$a$ is supported by a tilting surface $a$ or $b$ the other surface portion of the projection moves into recess 11.

Ring member 2 further comprises surfaces 14 on the middle projections and central extensions 15. Central extensions 15 form abutments 16 and 16'. The operative positions of the blocks are adjacent to and inside ring member 2. They are positioned between respective abutments 16 and 16' and these abutments cooperate with the sides 18 and 18' of the blocks to prevent peripheral movement of the blocks except within given limits. When the shaft starts rotation, if the blocks are in central position, they move slightly one way or the other until the sides of the blocks meet abutments 16 or 16' respectively, whereupon peripheral movement is prevented. The projections forming surfaces 14 cooperate with peripherally extending grooves 17 of the blocks in order to prevent the blocks from moving axially. Blocks 9 have the edges of the spherical bearing surfaces tapered off as indicated at 19. Between ring member 6 and the crank pin 8 is a key 23. A key 26 is also provided between the bearing housing and annular member 2. These keys prevent improper displacement.

The bearing operates as follows:

Assuming that the shaft 8 together with the rotary member 6 begin to rotate in the direction indicated by the arrow in Fig. 5, all the bearing blocks 9 are moved slightly from the position shown in Fig. 4 until the blocks reach the position shown in Fig. 5, wherein the edge 18 strikes abutment 16. The blocks are then tilted because the surface portion of projection 12 adjacent to side 13 is supported by the tilting surface $a$ whereas the surface portion of projection 12 adjacent to side 13' is over recess 11. The side 13' therefore settles into the recess and the right-hand side of the block (as shown in Fig. 5) moves radially outward. By this means, each block is eccentrically displaced so that a wedge-like space is formed between each block and the bearing surface 7. The oil film exists in this wedge-like space. By having this wedge-like shape, the oil can support very heavy loads. It will be seen that the space for the oil grows less in the direction of rotation. Accordingly, oil is forced into this space under high pressure. The formation of the edges 19 aid somewhat in obtaining this result. On account of the tilted position of the blocks and the manner of tilting the block, the blocks will automatically adjust themselves to the most suitable position for a given speed of rotation, load or viscosity of oil.

The conditions explained in connection with rotation as indicated in Fig. 5 also arise with bearing blocks in accordance with the invention if the shaft rotation is reversed. If the shaft rotation is reversed to the position shown in Fig. 6, the surface portion of projection 12 adjacent to side 13' becomes supported over surface $b$ and side 13 sinks into recess 11, thus tilting the block in the other direction. In passing from the position shown in Fig. 5 to the position shown in Fig. 6, the bearing block passes through the position shown in Fig. 3 and Fig. 4, in which position both tilting surfaces $a$ and $b$ support projection 12 of the block. The movement involving these various positions takes place due to the fact that friction between the blocks and the bearing surface 7 of rotatable member 6 is greater than the friction between the blocks and the annular ring 2 because of the formation of the wedge-shaped oil film spaces. This takes place readily in a bearing of a connecting rod since the load on the bearing is reduced and changes direction in the up and down movement of the connecting rod. In view of this, the movement of the blocks can readily be accomplished in bearings, for instance, in radial thrust bearings of common type, in which the load is decreased more or less in certain positions of rotation or change of rotation as is the case with connecting rods.

By means of the above described spherical bearing surfaces of the blocks which cooperate with the spherical surface of the rotating part, ill effects from bending of the shaft or lack of alignment are eliminated. This is important because, without the spherical bearing surfaces, a slight variance from alignment might produce unevenness in the oil film and cause direct metal to metal contact, which would be disadvantageous and perhaps cause destruction of the bearing. By means of the spherical surfaces, the bearing is also capable of taking up axial thrust to a certain degree. In order to take up axial thrust, the bearing surface and the corresponding surfaces of the blocks may be made in the form of a single or double cone.

Instead of having the projecting surfaces 14 in ring member 2, and cooperating grooves 17 in the blocks, it is obvious that the block surfaces may be the extended surfaces and recesses provided in the ring member 2 to correspond with the same. It is also possible to eliminate the annular ring member 2 in the form shown by making the housing itself comprise this ring member as a unitary structure. Furthermore, it will be obvious that member 6 could be omitted by providing the bearing surface direct on the shaft.

While I have shown one form of the invention only, it will be readily understood that the invention may be carried out in further forms and that it is not to be limited to the preferred construction shown and described.

What I claim is:

1. A connecting rod bearing comprising a bearing housing, a ring member mounted in said bearing housing comprising an annular cylindrical portion and a symmetrical projecting portion extending inwardly from the middle of the cylindrical portion, said projecting portion having central extensions and said cylindrical portion having recesses on the inside thereof between said projecting portions, a plurality of bearing blocks having operative positions adjacent to and inside said ring member, said blocks having surfaces cooperating with said projecting portion and said recesses to tilt the blocks one way on shaft rotation in one direction and the other way on shaft rotation in the other direction.

2. A ring element for a connecting rod bearing comprising an annular cylindrical portion and a symmetrical projecting portion extending inwardly from the middle of the cylindrical portion, said projecting portions having central extensions and said cylindrical portion having recesses on the inside thereof between said projecting portions.

3. A connecting rod comprising a bearing yoke, a cap, an annular outer bearing member carried between said yoke and said cap, a plurality of bearing blocks having operative positions inside and adjacent said bearing, said blocks and bearing member having peripherally spaced cooperating surfaces arranged to provide alternative peripherally spaced supports for causing movement of the blocks in one rotational direction with respect to the bearing member to tilt the blocks correspondingly up on one side thereof and movement of the blocks in the opposite rotational direction with respect to the bearing member to tilt the blocks up on the opposite sides thereof, a rotatable member passing through said bearing member and cooperating with said blocks to effect the aforementioned movement and means forming part of said bearing member for limiting movement of the blocks with respect to the bearing member.

4. A bearing of the radial type comprising a member movably mounted but non-rotatable about its own axis, a plurality of bearing blocks having operative positions adjacent said member, said member and each of said blocks having peripherally spaced cooperating surfaces arranged to provide alternative peripherally spaced supports for causing movement of the blocks in one direction with respect to said member to tilt the blocks up on one side and movement of the blocks in the other direction with respect to said member to tilt the blocks up on the opposite side, and means forming part of said member for limiting movement of the blocks with respect to said member.

5. A bearing of the radial type comprising an outer member movably mounted but non-rotatable about its own axis, a plurality of bearing blocks inside and adjacent to said member, said member and each of said blocks having peripherally spaced cooperating surfaces arranged to provide alternative peripherally spaced supports for causing movement of the blocks in one direction with respect to said outer member to tilt the blocks up on one side and movement of the blocks in the other direction with respect to said outer member to tilt the blocks up on the opposite side, an inner rotatable member cooperating with said blocks to effect the aforementioned movement, and means forming part of said outer member for limiting movement of said blocks with respect to said outer member.

6. A bearing of the radial type comprising an outer member movably mounted but non-rotatable about its own axis, a plurality of bearing blocks inside and adjacent to said member, said member and each of said blocks having peripherally spaced cooperating surfaces arranged to provide alternative peripherally spaced supports for causing movement of the blocks in one direction with respect to said outer member to tilt the blocks up on one side and movement of the blocks in the other direction with respect to said outer member to tilt the blocks up on the opposite side, an inner rotatable member cooperating with said blocks to effect the aforementioned movement, and means comprising inwardly projecting abutments on said outer member for limiting movement of the blocks with respect to said outer member.

7. A bearing of the radial type comprising an outer member movably mounted but non-rotatable about its own axis, a plurality of bearing blocks having operative positions inside and adjacent said outer member, said outer member and each of said blocks having peripherally spaced cooperating surfaces arranged to provide alternative peripherally spaced supports for causing movement of the blocks in one direction with respect to the outer member to tilt the blocks up on one side and movement of the blocks in the opposite direction with respect to the outer member to tilt the blocks up on the opposite side, said blocks having spherically curved inner bearing surfaces, and a rotatable inner member passing through said outer member and having spherically curved bearing surface cooperating with the spherically curved bearing surfaces of said blocks to effect the aforementioned movement.

8. A bearing of the radial type comprising an outer member movably mounted but non-rotatable about its own axis, a plurality of bearing blocks having operative positions inside and adjacent said outer member, said outer member and each of said blocks having peripherally spaced cooperating surfaces arranged to provide alternative peripherally spaced supports for causing movement of the blocks in one direction with respect to the outer member to tilt the blocks up on one side and movement of the blocks in the opposite direction with respect to the outer member to tilt the blocks up on the opposite side, said blocks having spherically curved inner bearing surfaces, a rotatable inner member passing through said outer member and having spherically curved bearing surface cooperating with the spherically curved bearing surfaces of said blocks to effect the aforementioned movement, and means comprising inwardly projecting abutments on said outer member for limiting movement of the blocks with respect to the outer member.

9. A connecting rod comprising rod elements carrying an annular outer bearing member, a plurality of bearing blocks having operative positions inside and adjacent said outer member, said outer member and each of said blocks having peripherally spaced cooperating surfaces arranged to provide alternative peripherally spaced supports for causing movement of the blocks in one rotational direction with respect to said outer member to tilt the blocks correspondingly up on one side thereof and movement of the blocks in the opposite direction with respect to said outer member to tilt the blocks up on the opposite sides thereof, a rotatable inner bearing member passing through said outer member and cooperating with said blocks to effect the aforementioned movement and means forming part of said outer member for limiting rotational movement of the blocks with respect to the outer member.

10. A connecting rod comprising rod elements carrying an annular outer bearing member, a plurality of bearing blocks having operative positions inside and adjacent said outer member, said outer member and each of said blocks having peripherally spaced cooperating surfaces arranged to provide alternative peripherally spaced supports for causing movement of the blocks in one rotational direction with respect to said outer member to tilt the blocks correspondingly up on one side thereof and movement of the blocks in the opposite direction with respect to said outer member to tilt the blocks up on the opposite sides thereof, a separable rotatable inner bearing member passing through said outer member and cooperating with said blocks to effect the aforementioned movement and means forming part of said outer member for limiting rotational movement of the blocks with respect to the outer member.

11. A connecting rod comprising rod elements carrying an annular outer bearing member, a plurality of bearing blocks having operative positions inside and adjacent said outer member, said outer member and each of said blocks having peripherally spaced cooperating surfaces arranged to provide alternative peripherally spaced supports for causing movement of the blocks in one rotational direction with respect to said outer member to tilt the blocks correspondingly up on one side thereof and movement of the blocks in the opposite direction with respect to said outer member to tilt the blocks up on the opposite sides thereof, a rotatable inner bearing member passing through said outer member and cooperating with said blocks to effect the aforementioned movement, inwardly extending peripherally spaced projections providing abutments for limiting rotational movement of the blocks with respect to the outer member, and peripherally disposed projections forming part of the outer member for guiding the blocks and limiting axial movement thereof with respect to the outer member.

12. A connecting rod comprising rod elements carrying an annular outer bearing member, a plurality of bearing blocks having operative positions inside and adjacent said outer member, said outer member and each of said blocks having peripherally spaced cooperating surfaces arranged to provide alternative peripherally spaced supports for causing movement of the blocks in one rotational direction with respect to said outer member to tilt the blocks correspondingly up on one side thereof and movement of the blocks in the opposite direction with respect to said outer member to tilt the blocks up on the opposite sides thereof, a rotatable inner bearing member passing through said outer member and cooperating with said blocks to effect the aforementioned movement, said blocks having peripheral grooves therein and projections forming a part of said outer member extending into said grooves for guiding the blocks and limiting the axial movement thereof with respect to the outer member.

13. A connecting rod comprising rod elements carrying an annular outer bearing member, a plurality of bearing blocks having operative positions inside and adjacent said outer member, said outer member and each of said blocks having peripherally spaced cooperating surfaces arranged to provide alternative peripherally spaced supports for causing movement of the blocks in one rotational direction with respect to said outer member to tilt the blocks correspondingly up on one side thereof and movement of the blocks in the opposite direction with respect to said outer member to tilt the blocks up on the opposite sides thereof, said blocks having inner spherically curved bearing surfaces, a rotatable member passing through said outer member and having spherically curved bearing surface cooperating with the spherically curved surfaces of said blocks to effect the aforementioned movement, and means providing abutments on said outer member for limiting rotational movement of the blocks with respect to the outer member.

14. A bearing of the radial type comprising a member movably mounted but non-rotatable about its own axis, a plurality of bearing blocks having operative positions adjacent to said member, said member and each of said blocks having peripherally spaced cooperating surfaces arranged to provide alternative peripherally spaced supports for causing movement of the blocks in one direction with respect to said member to tilt the blocks correspondingly up on one side thereof and movement of the blocks in the other direction with respect to said member to tilt the blocks up on the opposite sides thereof, and said blocks and said member having peripherally disposed cooperating surfaces for limiting axial movement of the blocks with respect to said member.

15. A bearing of the radial type comprising a member movably mounted but non-rotatable about its own axis, a plurality of bearing blocks having operative positions adjacent to said member, said member and each of said blocks having peripherally spaced cooperating surfaces arranged to provide alternative periperally spaced supports for causing movement of the blocks in one direction with respect to said member to tilt the blocks correspondingly up on one side thereof and movement of the blocks in the other direction with respect to said member to tilt the blocks up on the opposite sides thereof, each of said blocks having centrally disposed peripheral grooves therein and said member having projections extending into said grooves for guiding the blocks and limiting the axial movement thereof with respect to said member.

In testimony whereof I have affixed my signature.

AUGUST GUNNAR FERDINAND WALLGREN.